United States Patent
Rutten

(10) Patent No.: US 9,066,504 B2
(45) Date of Patent: Jun. 30, 2015

(54) FISHING REEL CONVERSION ATTACHMENT

(75) Inventor: Charles R. Rutten, Palatka, FL (US)

(73) Assignee: Reel Widgets, LLC, Melbourne, FL (US)

( * ) Notice: Subject to any disclaimer, the term of this patent is extended or adjusted under 35 U.S.C. 154(b) by 60 days.

(21) Appl. No.: 13/474,639

(22) Filed: May 17, 2012

(65) Prior Publication Data

US 2013/0015283 A1    Jan. 17, 2013

Related U.S. Application Data

(60) Provisional application No. 61/486,825, filed on May 17, 2011.

(51) Int. Cl.
| | | |
|---|---|---|
| A01K 89/01 | (2006.01) | |
| A01K 89/00 | (2006.01) | |
| A01K 89/012 | (2006.01) | |
| A01K 89/017 | (2006.01) | |

(52) U.S. Cl.
CPC ............... *A01K 89/00* (2013.01); *A01K 89/012* (2013.01); *A01K 89/017* (2013.01)

(58) Field of Classification Search
USPC ............................ 254/323, 249, 250, 225, 283
See application file for complete search history.

(56) References Cited

U.S. PATENT DOCUMENTS

| | | | | |
|---|---|---|---|---|
| 3,126,166 A * | 3/1964 | Weinberg | | 242/250 |
| 4,283,025 A * | 8/1981 | Whisenhunt | | 242/250 |
| 4,962,901 A * | 10/1990 | Shirley et al. | | 242/323 |
| 6,015,111 A * | 1/2000 | Berke | | 242/394 |
| 7,086,622 B1 * | 8/2006 | Whaley | | 242/323 |
| 7,334,749 B2 | 2/2008 | Terauchi et al. | | |
| 7,398,939 B2 | 7/2008 | Terauchi et al. | | |
| 7,748,657 B1 * | 7/2010 | Goodman | | 242/323 |
| 7,909,280 B1 * | 3/2011 | Herrick | | 242/323 |
| 2003/0168546 A1 * | 9/2003 | Bankston | | 242/390.8 |
| 2005/0066780 A1 * | 3/2005 | Kobert et al. | | 81/466 |

OTHER PUBLICATIONS

"The "Reel Crankie" Creative inventions for fishermen by Innovative Fishing Tackle", http://www.innovativefishingtackle.com/The_Reel_Crankie.html, May 10, 2011.

* cited by examiner

*Primary Examiner* — Emmanuel M Marcelo
(74) *Attorney, Agent, or Firm* — Timothy H. Van Dyke; Beusse, Wolter, Sanks & Maire, P.A.

(57) ABSTRACT

Disclosed herein are devices for transferring mechanical force from an electric motor to a fishing reel. Also disclosed are method of using devices to transferring mechanical force to a fishing reel. In an exemplary embodiment, the device includes a body that has at least one groove and at least one slot that are configured for removably engaging a crank arm of a fishing reel. The fishing reel crank arm includes a first end attached to a crank knob arm assembly for attaching the crank arm to the reel. The crank arm also has a second end that includes a crank handle shaft projecting from said second end. The body includes, at the first side, a groove defined therein for receiving the crank arm and a slot defined along an edge of the body for removably engaging the crank handle shaft.

9 Claims, 5 Drawing Sheets

FISHING REEL CONVERSION ATTACHMENT

FIELD OF INVENTION

This invention relates to an improved method of converting a manual fishing reel to an electric reel. In particular, the invention relates to a method of using a mechanical coupling device to transfer power from an electric motor to a conventional mechanical reel.

BACKGROUND

Mechanical reels are commonly used in the field of fishing to pay out and retrieve fishing line. While electric reels are not uncommon, such devices are expensive, bulky, and prone to mechanical issues.

A number of devices exist that have been designed to transfer mechanical force from an electric motor, such as from a corded or cordless drill, to a fishing reel for the purpose of spooling line. Very few devices have been designed for the purpose of retrieving bait, or more importantly, reeling in fish.

Each of these devices are similar in that they all are difficult to use, are fragile, and do not function well for this purpose.

The inventors have realized that it would be desirable to have an improved method of transferring mechanical energy from a portable device such as a cordless drill that was easy to use, could be quickly and easily transferred between reels yet would stay firmly attached to the reel in use, and could withstand the forces put upon it in the course of retrieving fish.

The present invention represents an innovative device which offers superior performance for the intended purpose and is inexpensive as compared to any other device available that will serve the same purpose. This results in an obvious economic advantage over previously known methods.

SUMMARY

A device for improving the transfer of mechanical force from a portable electric device to a standard fishing reel is provided.

In the process of retrieving line with a reel, force must be applied to a spool so that it rotates in a clockwise direction to take in line. Any force attempting to move the spool in a counter-clockwise direction is counteracted by the drag set on the reel. Typically, a crank is attached to and perpendicular to the center of the spool, and is fitted with a rotating knob to facilitate the action of winding in the line. This serves to provide mechanical advantage provided by the moment-arm which is at a fixed distance between the center of the spool and the knob, or handle at the end of the crank arm.

The inventors have surmised that a new device designed to quickly and securely attach to a standard reel which could be easily released from the reel, and transfer mechanical power at the maximum moment-arm afforded by the crank and handle will offer significant advantages over current devices. This device works by two primary mechanisms; 1) by providing a guidance mechanism by which the device can be quickly, easily and securely attached to a reel without the need for special tools, and 2) by transferring mechanical energy to the point of the reel that will offer the greatest mechanical advantage to the device.

This method of transferring mechanical energy to a reel provides significant benefits by simplifying the process of attaching the device to the reel, affording a secure connection so that the device does not un-attach from the reel prematurely, and by providing a mechanism whereby the mechanical force applied to the crank or handle by a portable electric motor, such as a cordless drill, can overcome the maximum drag set on the reel.

According, to one embodiment, the invention pertains to a device comprised of a main body for securing the device to a reel crank and handle and for transferring mechanical energy to the handle, an arbor to connect the device to a portable electronic device, and a backing plate to both assist in guiding the device onto the reel crank and to secure the device to the reel when in use. Other inventive embodiments are described herein.

DETAILED DESCRIPTION

Figure 1:
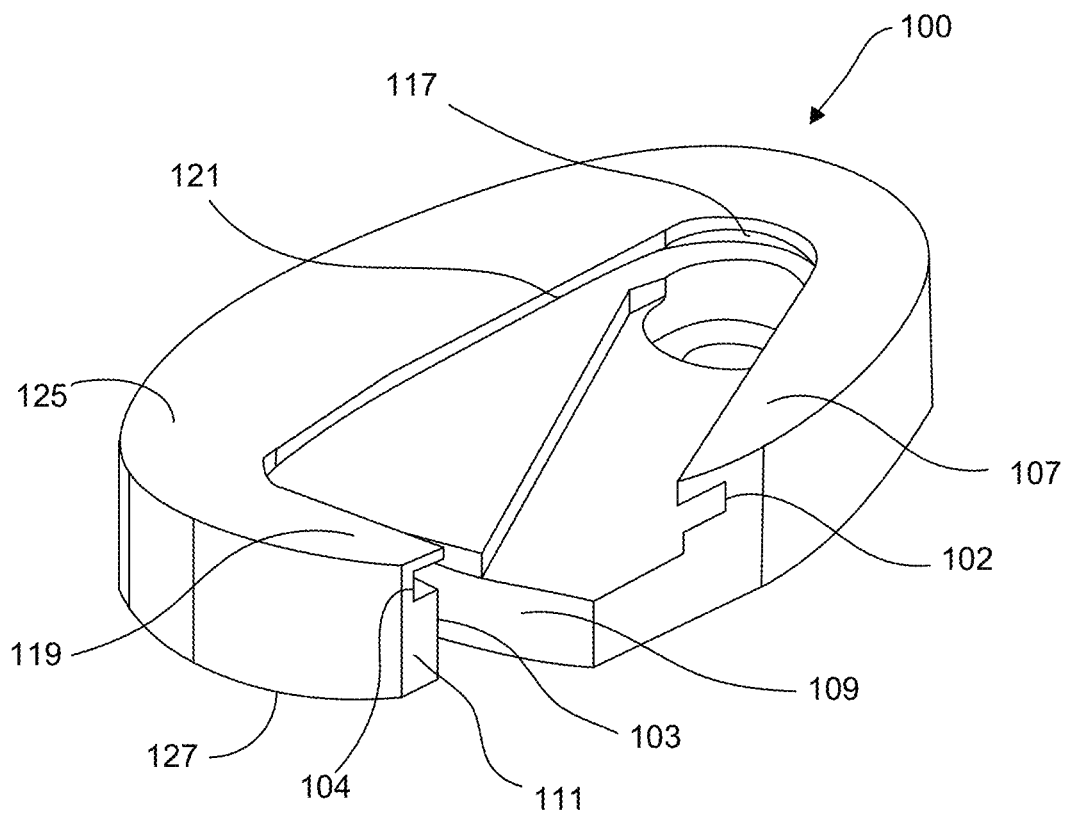
FIG. 1 shows a perspective view of a device embodiment of the present invention.

The subject invention is directed to novel device for transferring mechanical energy from an electric motor, such as in a cordless drill, to a fishing reel. In one embodiment, the invention is directed to a device to transfer mechanical force from an electric motor to a fishing reel that includes a body having a first side and a second side. The body comprises at least one groove and at least one slot that are configured for removably engaging a crank arm of a fishing reel. The fishing reel crank arm includes a first end attached to a crank knob arm assembly for attaching the crank arm to the reel. The crank arm also has a second end that includes a crank handle shaft projecting from said second end. The body includes, at the first side, a groove defined therein for receiving the crank arm and a slot defined along an edge of the body for removably engaging the crank handle shaft. Associated with the second side of the body is typically an arbor. The arbor is typically rigidly engaged to the second side of the body and transversely projects out from the plane of the body such that torsional force applied to the arbor causes force to be applied to the crank handle shaft. In an alternative embodiment, the body includes an actuating receptacle defined on the second side for insertion of a drive device to deliver torsional force. The format of the receptacle and drive device can take any number of shapes, including a star, hexagonal, square, triangular, etc.

Embodiments of the present invention may facilitate retrieving line, bait, tackle, or fish from extended distances or depth. Certain embodiments may be used to facilitate spooling line. Furthermore, certain embodiments of the device may be used to increase the speed and ease with which one can retrieve line, such as when bringing in lines when trolling. The device may also be used to retrieve fish if a motor is used which provide sufficient torque to overcome the drag on the reel, such as any common 18 volt cordless drill. Because the mechanical advantage achieved with certain embodiments of the invention, the device may be also used to retrieve line or spool line using a less powerful motor, such as can be found in a 12 or 14 volt cordless drill.

The reduced time required for bringing in line provides a substantial benefit to fishermen, and the likelihood of having lines tangle is greatly reduced. Device embodiments are also able to retrieve line quickly from significant depths. This provides a significant advantage in that line can be retrieved quickly and easily in order to check the status of bait and tackle.

The primary challenges to designing a device that overcomes that difficulties encountered by other inventions are the mechanism by which the device is attached to a reel, and the ability of such a device to withstand the forces put upon it in the act of retrieving weighted line. Certain embodiments of the present invention overcome these obstacles and provide the following advantageous features:

The use of body with strategically placed grooves and slots not only as a guide by which the device can be attached to the real crank, but also serves as a retaining mechanism to prevent the device from moving in an axial direction perpendicular to the arbor, or spool axle, and de-attaching from the reel both during attachment and when in use. When functioning as a guide for attachment, it allows the operator to easily and quickly secure the device to the reel with one hand.

The 'over-center' locking mechanism provides for secure attachment of the device to the reel.

The 'backing plate' design allows for positive attachment of the device to one side of the reel crank handle during the attachment process (sliding the device onto to the handle), at the bottom end of the backing plate once the device is seated fully on the handle and the device is being transferred to the 'over-center locked position', and on the opposite side of the crank handle as the device moved past the over-center locking mechanism.

The 'over-center' locking mechanism allows the device to be quickly unattached from the reel by making a ¼ counter-clockwise turn and then sliding the device off the crank. This can also be accomplished easily with one hand, and can done with the drill attached to the arbor.

The coupling of a fishing reel to an electric motor can be accomplished according to known methods, see for example U.S. Pat. No. 7,309,039. The Stone invention discloses a device intended for this purpose which is dependent on having a reel with a crank, handle and a counterweight arranged at opposite ends wherein the device has a pair of diametrically opposed tapered projections for releasably engaging the reel crank. This example clearly illustrates the difficulties involved in designing a device that will function using a single crank and handle without the need for a second attachment point. The present invention resolves these issues.

The mechanism of attachment of the present device is unique in that it allows one handed attachment or de-attachment from the reel, and provides a mechanical advantage by having a moment-arm that is extended beyond the shaft to the handle. The present invention transfers force along the crank arm beyond the knob or handle to the most distant point so that maximum mechanical advantage can be achieved. This characteristic enables the present invention to be used not only to spool line, but to reel in fish, as the force supplied by a standard 18V cordless drill, when transferred to the point of maximum mechanical advantage is capable of overcoming the maximum drag setting of a reel.

Other examples of known methods can be found in U.S. Pat. No. 7,334,749 and U.S. Pat. No. 7,398,939. These examples are typical of the most common attempt to design an electrically powered fishing reel whereby the electric motor is placed in the reel itself. Devices based on these designs are being manufactured and marketed over the past few years, and cost $2,000 to $3,000. The present invention provides an alternative method of using an external motor to power the device which has been unknown until disclosed in the present invention, and will sell for less than $100.

Figure 2:
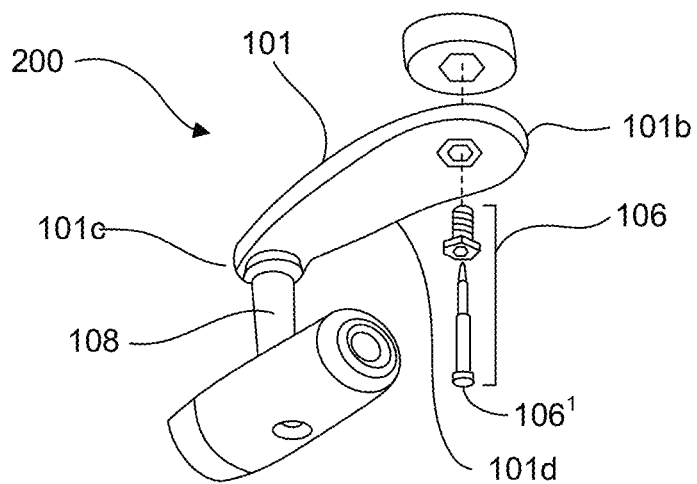
FIG. 2 shows an example of a disassembled view of a crank arm assembly onto which a device embodiment may be engaged.

Briefly, referring to FIG. 1, a quick engage device embodiment 100 is shown. The device 100 is designed for quickly engaging and releasing a reel that includes a reel that utilizes a crank arm assembly 200 such as that shown in FIG. 2. To assist in explaining the device 100, description of the crank arm assembly 200 will be described in conjunction with the device so that the features and operation of the device 100 can be properly understood.

The device 100 includes a plate body 107 having a front side 125 and a back side 127 and that includes a number of features for attaching to the crank arm assembly 200. The body 107 has a groove 102 into which the crank arm 101 slides. In typical operation, the proximal end 101b is initially inserted into the groove 102. The crank arm 101 is then stabilized and guided into position at the distal end 111 of the device 100, which comprises the over-center locking mechanism 103. The over-center locking mechanism 103 has a receiving groove 104. A shallow recess 105 allows space for the bolt head or nut 106' holding the crank arm 101 to the reel to slide into the device 100 and further acts as a guide. The body 107 holds the device 100 onto the crank arm 101 and acts as a guide during attachment, and further guides the crank arm 101 into place and provides a secure attachment to the reel once the crank handle shaft 108 is locked into place by ¼ clockwise rotation of the device 100 or crank handle shaft 108.

In the first stage of attaching the device 100 to the reel, the groove 102 as a guide so that the crank arm 101 can be inserted into the device 100 with one hand, and remains in the proper position while it is being slid onto the crank arm 101. During this step, the over-center locking mechanism 103, particularly groove 104 also acts as a guide to keep the device 100 aligned with the crank arm 101. Once the crank arm is fully seated in the receiving groove 117, the crank handle shaft 108 is captured in the slot 109 at the distal end of the device. The groove 104 accepts the distal end of the crank handle shaft 101c. Clockwise rotation of the device 100 moves the crank handle shaft 108 over the over-center locking mechanism 103 and into slot 109, and the side of the crank arm 101d is secured in the slot 121. To remove the device from the reel, the device is rotated counter-clockwise so that the crank handle shaft 108 is free of the slot 109. The device 100 can then be slid off the crank arm 101 and the process is repeated to re-attach the device to another reel.

Figure 3:
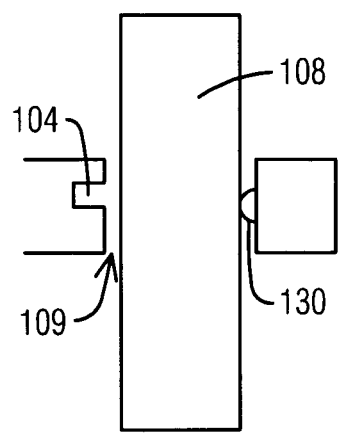
FIG. 3 shows a cross-sectional view of a portion of a device embodiment to reveal a locking member that assists in holding the device onto a crank arm assembly.
Figure 4:
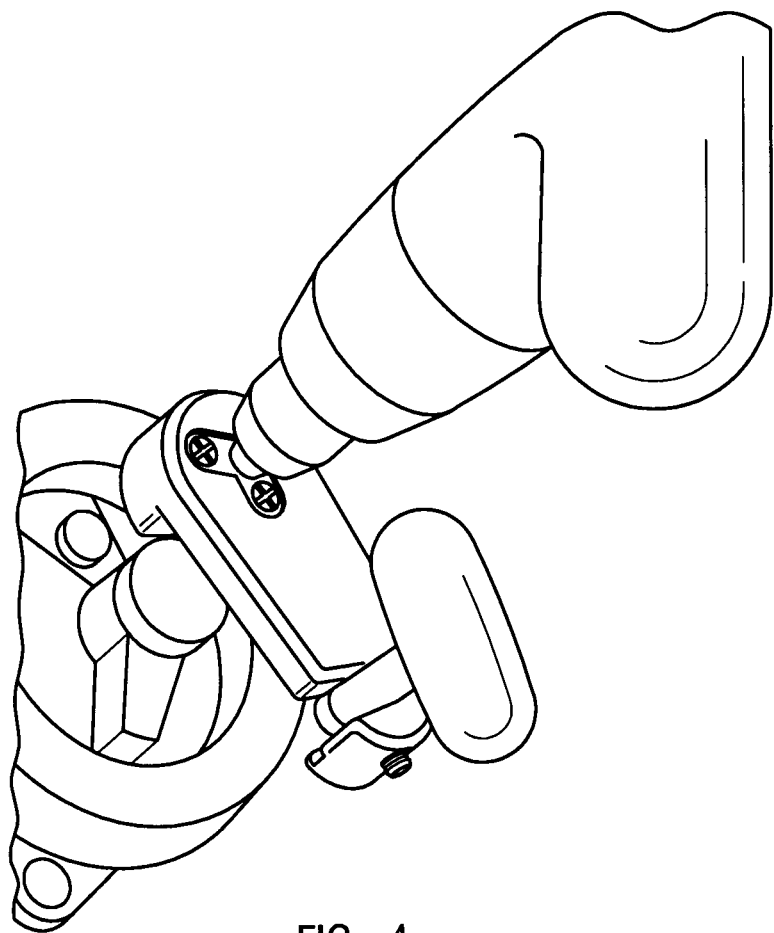
FIG. 4 shows a photograph of a device embodiment engaged to a reel and that is connected to a power drill.
Figure 6:
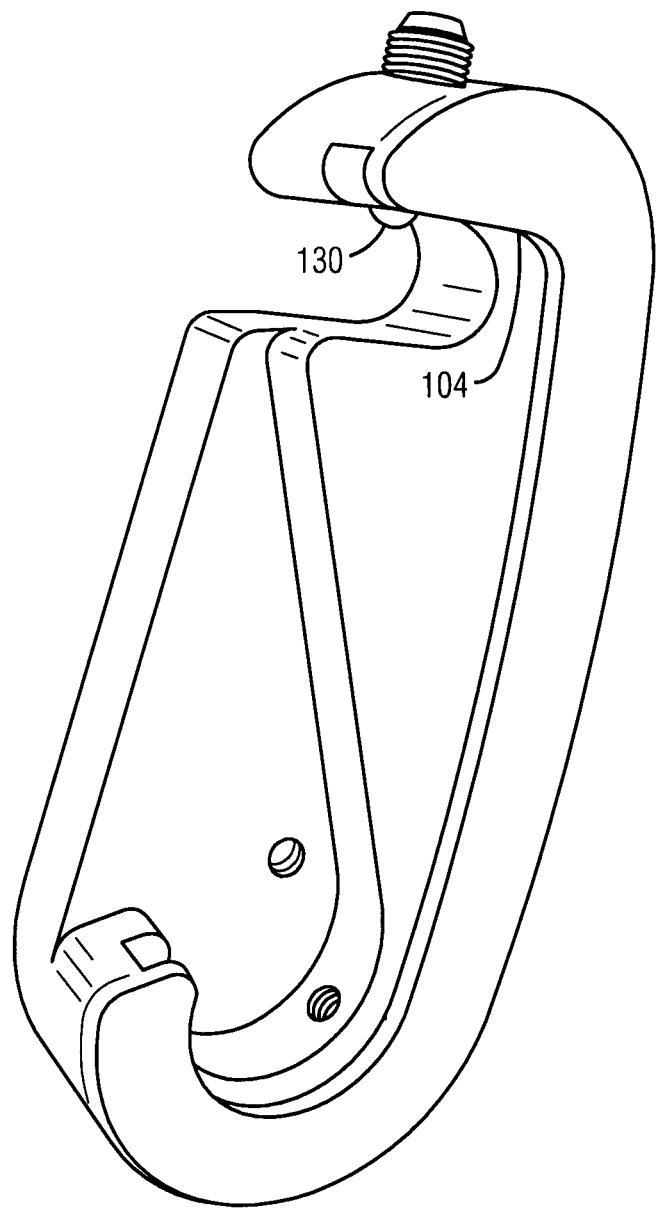
FIG. 6 shows a perspective view of a front side of a device embodiment.

FIG. 3 shows a cross section of an alternative embodiment where the body 107 includes a lock member 130 (see also FIG. 6) proximate to the slot 109 to assist in holding the crank handle shaft 108 in the slot 109. Those skilled in the art will appreciate that the lock member could be located a number of locations on the body 107 so long as it is effective to assist in holding in the crank shaft handle 108. The lock member can also take any number of forms including, but not limited to, a spring loaded ball in socket mechanism or a simple raised projection such as a nub to allow a friction fit. FIG. 4 shows a photograph of a device embodiment attached to a reel.

Figure 5:
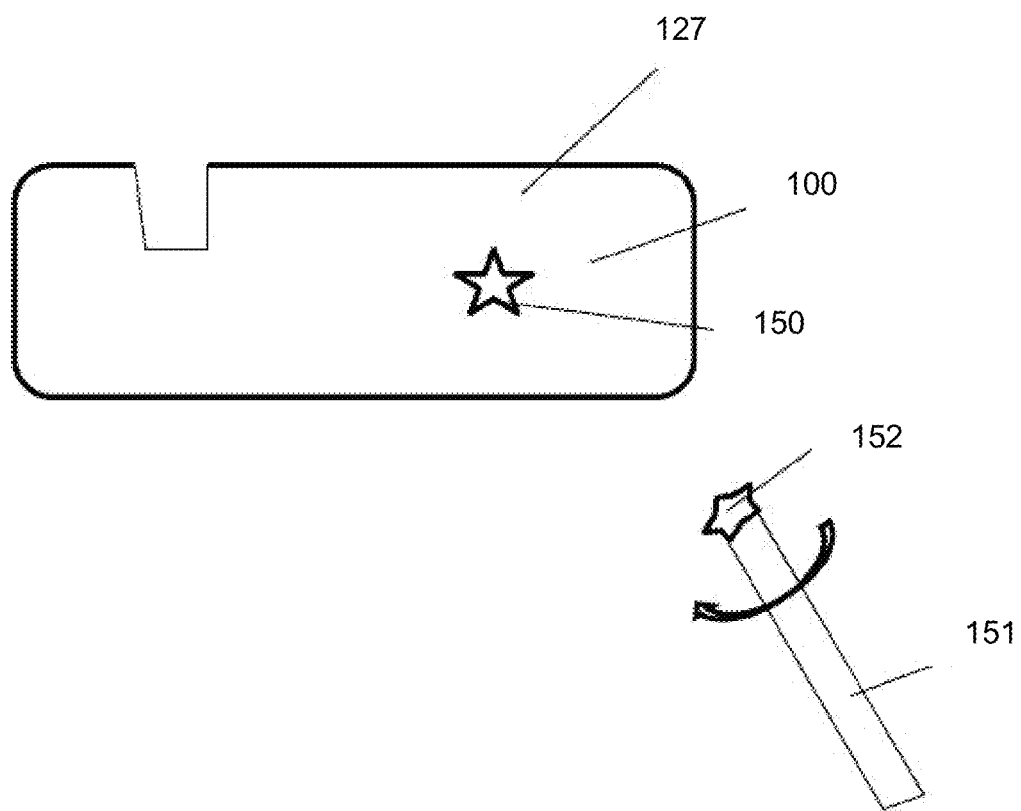
FIG. 5 shows an alternative embodiment that shows a receptacle and drive for applying torsional force to a device embodiment.

FIG. 5 shows an alternative embodiment of device 100 that shows a star receptacle 150 defined in the back side 127 of the device 100. A star drive 152 is inserted into the receptacle 150 in order to apply torsional force to the device 100 such as through use of a power drill connected to the arbor 151 of the star drive 152. As mentioned above, in a typical embodiment, an arbor is rigidly associated with the device 100 and projects out from its back side. The arbor stays connected to a force applying machine and the device 100 is attached and reattached to a reel or successive reels without being removed from the force applying machine.

Figure 7:
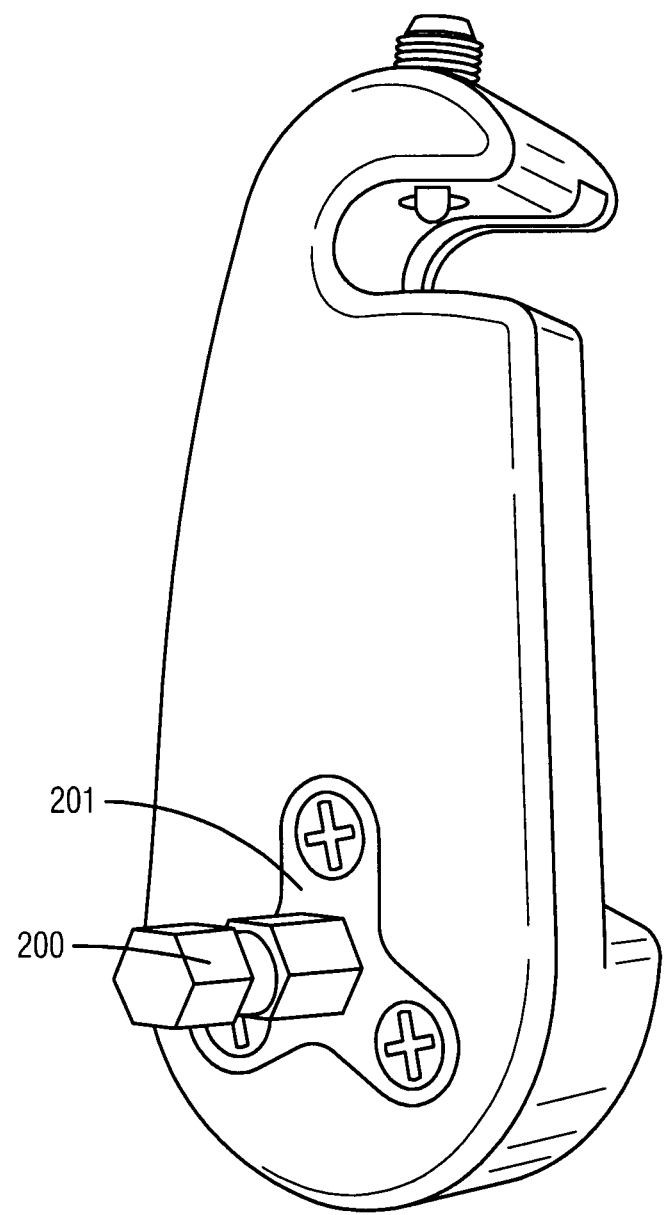
FIG. 7 shows a back side of a device embodiment.

FIG. 7 shows a perspective view of the back side of a device embodiment. FIG. 7 shows an arbor 202 that is rigidly attached to the device and projects out from the back side of the device. The arbor 202 is attached by a screw-in mechanism 201.

While a number of embodiments of the present invention have been shown and described herein in the present context, such embodiments are provided by way of example only, and not of limitation. Numerous variations, changes and substitutions will occur to those of skilled in the art without materially departing from the invention herein. the disclosure of any reference herein are incorporated to the extent not inconsistent with the teachings herein.

What is claimed is:

1. A device to transfer mechanical force from an electric motor to a fishing reel, said device comprising:

a body having a first side and a second side, the first side configured for removably engaging a crank arm of a fishing reel, wherein the fishing reel crank arm has a first end attached to a crank knob arm assembly for attachment of the crank arm to the fishing reel and a second end having a crank handle shaft transversely projecting from said second end, the body comprising a space defined therein for receiving the crank arm and a slot defined sectionally into an edge of the body for removably engaging the crank handle shaft;

a receiving groove in a proximal end of the device configured to receive the proximal end of the crank arm, and a slot groove in the distal end of the device, defined tangential to said slot, configured to receive a distal end of the crank handle shaft so as to removably engage the crank arm of the fishing reel, whereby the receiving groove both guides the device onto the reel, and secures the device to the crank arm; and either an arbor rigidly engaged with the second side of said body or an actuating receptacle for receiving a rotating actuation member.

2. The device of claim 1, wherein said arbor is configured for association with a power drill.

3. The device of claim 1, wherein said body comprises a locking member at said slot to facilitate engagement of the crank handle shaft in said slot.

4. The device of claim 1, wherein said body comprises a receptacle defined on the first side for receiving at least a portion of the crank knob assembly.

5. The device of claim 1, wherein said device comprises the arbor rigidly engaged with the second side of the body.

6. The device of claim 1, wherein said device comprises the actuating receptacle.

7. A method of applying torsional force from an electric motor to a fishing reel, the method comprising attaching the device of claim 1 to the fishing reel.

8. The method of claim 7, wherein said device comprises a locking member at said slot to facilitate engagement of the crank handle shaft in said slot.

9. The method of claim 7, wherein the electric motor comprises a power drill, and wherein said arbor of said device is configured to engage with said power drill.

* * * * *